Aug. 17, 1954 R. M. WALKER 2,686,878

POWER STABILIZER

Filed April 1, 1946

INVENTOR
RICHARD M. WALKER
BY M. A. Hayes
ATTORNEY

Patented Aug. 17, 1954

2,686,878

UNITED STATES PATENT OFFICE 2,686,878

POWER STABILIZER

Richard M. Walker, Dorchester, Mass., assignor, by mesne assignments, to the United States of America as represented by the Secretary of the Navy Application April 1, 1946, Serial No. 658,593

6 Claims. (Cl. 250—36)

This invention relates to electrical equipment, and more particularly to apparatus for stabilizing the power output of an oscillator.

It is frequently desirable that the output of an oscillator be maintained constant at a predetermined power level. In illustration, in research and production testing on R.-F. components requiring broadbanding, it is desirable to be able to make voltage standing wave checks at several distinct frequencies simultaneously. Among the many specific tasks for a voltage standing wave measuring equipment would be the adjustment of tunable components for minimum standing waves, the sorting and rejection of components which must have a voltage standing wave ratio less than some specified value, and the measurement of the absolute magnitude of the voltage standing wave ratio of components. One such measuring equipment includes a bridge network to which is fed several frequencies simultaneously from a like number of frequency modulated carrier oscillators. The bridge output, which is a function of the degree of mismatch of the component under test, may be isolated at each of the desired test frequencies by a heterodyne process, and the resulting intermediate frequency signal detected and applied to a cathode ray tube. It is apparent that for the absolute magnitude of the deflection of the scope to have any meaning, the power input to the bridge network must be held constant at a predetermined level for all points in the frequency sweep of the several carrier oscillators. This is just one example of a situation where such power stabilization is desirable.

It is, then, the object of the present invention to provide apparatus for stabilizing the power output of an oscillator.

Another object is to provide apparatus wherein the mismatch of crystals in a magic-T as a function of power input is used as a criterion for power stabilization.

These and other objects will be more apparent upon consideration of the following specification, taken in connection with the accompanying drawings, forming a part thereof, in which.

Figure 1:
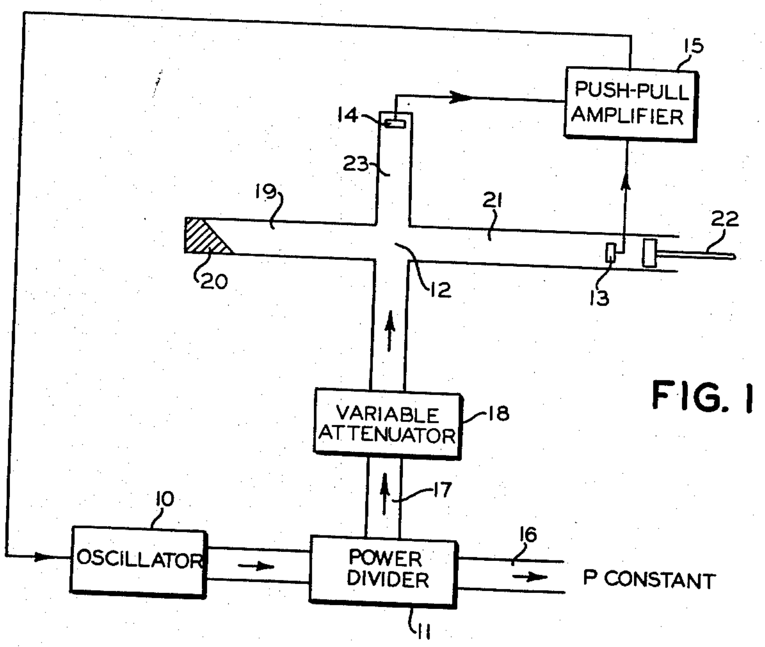
Fig. 1 is a block diagram of one embodiment of the power stabilization apparatus.

Briefly, the power from oscillator 10 is split at power divider 11 between the usual output and the power stabilization circuit. That portion of the power diverted toward the monitoring device is fed into magic-T 12. If crystal 13 represents a matched load, there will be no output from crystal 14. However, by choosing an operating point such that the output of the two crystals is equal, a stabilization voltage is obtained from amplifier 15 which, when applied to the reflector electrode of oscillator 10, will maintain constant its output power. A reflex oscillator capable of performing in the present system is disclosed in chapter 10, section 21 of "Ultra-High Frequency Techniques," by J. G. Brainerd, Glenn, Koehler, Herbert J. Reich and L. F. Woodruff, published by D. Van Nostrand Company, Inc., July 1942.

More specifically, the output of oscillator 10, in the present embodiment a reflex velocity-modulated tube, is fed to a broadband power divider 11. This power divider, which may take the form of a directional coupler, divides the oscillator output, diverting a small amount of the available power toward the stabilization circuit. A directional coupler which may be employed in this control circuit is disclosed in the copending application of Robert A. Rapuano, Serial No. 646,167, filed February 7, 1946, now U. S. Patent No. 2,549,385 of April 17, 1951. The useful output, maintained at a constant power level by the monitoring device, passes along branch 16.

That power going to the stabilization circuit through branch 17 is applied to the input arm of magic-T 12 through variable attenuator 18. The magic-T is one example of a class of 8-terminal networks whose impedance matrices possess certain symmetry properties. These networks, which are a form of bridge circuit, can be realized with lumped constants, with microwave or long line elements, or with combinations of these. To form a magic-T comprising wave guides, the axes of four branches must meet in a point. A first and a second of these branches must be symmetrical with respect to a plane which passes through the axes of the third and fourth branches, and which plane is also perpendicular to the electric lines of force within one of the third and fourth branches. The third and fourth branches are so disposed that the electric lines of force therein are mutually perpendicular. Differently stated, the magic-T consists of two T's soldered together, one lying in the plane of the electric vector and the other in the plane of the magnetic vector. These arms are referred to as the E-plane and the H-plane arm, respectively. The magic-T has the property of dividing power fed into the H-plane arm equally between two side arms if these arms are terminated in reflectionless loads. Under these conditions, no power is delivered to the E-plane arm. If, however, a termination which is perfectly matched to the guide is placed in one of the side arms and an imperfectly matched load in the other side arm, power is delivered to the E-plane arm and the magnitude of this power is proportional to the square of the magnitude of the reflection coefficient of the unmatched load.

Branch 19 of magic-T 12 is terminated with matched load 20, while branch 21 is terminated with crystal 13 and shorting plunger 22. If crystal 13 is matched to the line no power will be reflected and, therefore, no power will enter branch 23, which contains crystal 14. However, if there is a mismatch, power will be reflected from crystal 13 and will split between arm 23 and the input arm. Crystals 13 and 14 are connected to the input of a D. C. push-pull amplifier 15 having high gain and its output is applied to the reflector electrode of oscillator tube 10.

Figures 2, 3, 4:
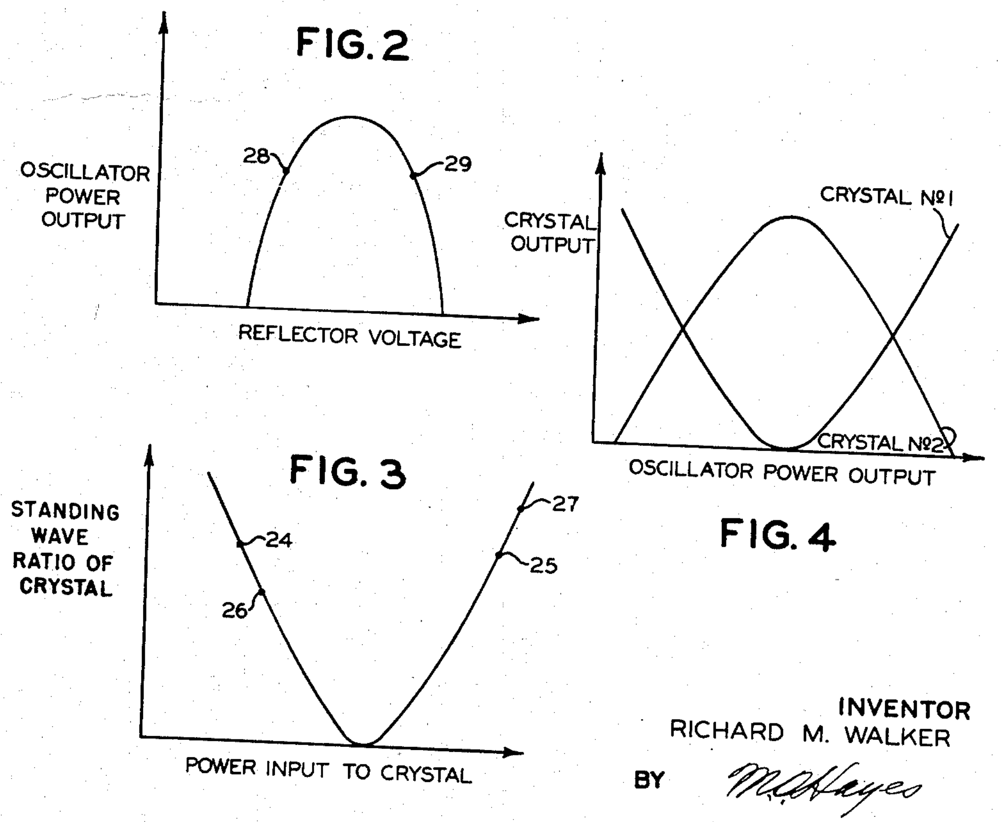
Fig. 2 is a graph indicating the relationship between the reflector voltage and the power output of the oscillator tube.
Fig. 3 is a graph showing the relationship between the power input to a crystal and the standing wave ratio of that crystal.
Fig. 4 is a graph showing the relationship between the oscillator power output and crystal output.

The reflector voltage control is set so that the tube is operating on the linear part of the curve of Fig. 2 at 28 or 29, this plot showing the relationship between the reflector voltage and the power output of the oscillator 10.

Because the crystal is a non-linear device, the match looking into crystal 13 will change quite abruptly with changes in the power fed into it, as shown graphically in Fig. 3, which is a plot of standing wave ratio versus input power. The degree of mismatch of crystal 13 changes the power fed to crystal 14. Therefore, by adjusting the shorting plunger 22 behind crystal 13, and adjusting variable attenuator 18, the stabilization device can be operated so that the outputs of the two crystals follow the curves plotted in Fig. 4. By properly connecting the crystal outputs into push-pull amplifier 15, when the output of oscillator 10 tends to increase and one crystal output decreases and the other increases, the amplifier 15 changes the reflector voltage so as to bring the tube output back to the chosen operating point (28 or 29 of Fig. 2).

In the place of the magic-T a fifty-fifty power divider can be employed. As far as the present control system is concerned, a conventional H-type T-junction can be used to achieve the fifty-fifty power division sought. The structural nature of such a junction is disclosed in chapter 10, article 16, of "Principles of Radar" by the staff of the Massachusetts Institute of Technology Radar School, published by the Technology Press in 1944. Crystals are placed in the two arms of the power divider, and the shorting plungers behind each crystal adjusted so that one crystal operates at point 24 of the graph of Fig. 3 and the other crystal operates at point 25. These crystals can be inserted in the arms of the power divider, for example, by means of the arrangement shown in chapter 10, article 21, of the above "Principles of Radar." An increase in power out of the oscillator will result in sliding the operating points to the right on the curve, for example to points 26 and 27. This results in a decreased output from the crystal which was operating at point 24 and an increased output from that crystal which was operating at point 25. These outputs, when applied to the push-pull amplifier, produce a stabilizing voltage which maintains constant the oscillator output.

It will be obvious to one skilled in the art that changes may be made in the circuits disclosed without departing from the invention, as sought to be defined in the following claims.

What is claimed is:

1. Apparatus for stabilizing the power output of an oscillator in which the power output is proportional to the voltage applied to its reflector electrode, said apparatus comprising a magic-T power divider having two output branches, first and second crystals positioned in said output branches, said crystals being so matched to the magic-T that a change in the power input to said magic-T changes the output voltage of said crystals in equal and opposite directions, means for coupling a portion of the output of said oscillator to said magic-T, a push-pull amplifier coupled to said crystals for combining and amplifying the output voltages of said crystals, and means for applying the output voltage of said amplifier to the reflector electrode of said oscillator to stabilize the power output thereof.

2. Apparatus for stabilizing the power output of an oscillator in which the power output is proportional to the voltage on its reflector electrode, said apparatus comprising, a magic-T consisting of a plurality of branch wave guides, means for applying a portion of the power output of said oscillator to a first branch of said magic-T, a first crystal positioned in a second branch of said magic-T and matched therewith to receive substantially one-half of a predetermined quantity of power applied to said first branch, a matched load terminating a third branch of said magic-T and receiving the other half of said predetermined quantity power applied to said first branch, a second crystal positioned in a fourth branch of said magic-T, said magic-T and its associated crystals being effective in response to deviations in the power from said predetermined quantity applied to said first branch to divide the power between said first and second crystals in proportion to the amount of said deviation, means for amplifying the output of said crystals to produce a voltage proportional to said deviation, and means applying said voltage to the reflector electrode of said oscillator to counteract said deviations in power output of said oscillator.

3. Apparatus for stabilizing the power output of an oscillator in which the power output is proportional to the voltage applied to its reflector electrode, said apparatus comprising a magic-T wave guide assembly, said magic-T having an H-plane arm, two side arms in a parallel electrical relationship with said H-plane arm and an E-plane arm in a series electrical relationship with said series arms, means for terminating one of said side arms in a reflectionless load, means for coupling a portion of the power output of said oscillator to said H-plane arm, a first crystal positioned in the other side arm and presenting an impedance mismatch thereto, a second crystal mounted in the E-plane arm, a push-pull amplifier, means for coupling said first and second crystals to the inputs of said amplifier and means for coupling the output of said amplifier to the reflector electrode of said oscillator to thereby regulate the power output thereof.

4. Apparatus for stabilizing a power output of an oscillator in which the power output is proportional to the voltage on its reflector electrode, said apparatus comprising a magic-T wave guide assembly consisting of an H-plane wave guide arm, a pair of side wave guide arms in a parallel electrical relationship with said H-plane arm and an E-plane wave guide arm, said E-plane arm being in series electrical relationship with said side arms, means for coupling a portion of the output of said oscillator to said H-plane arm, a reflectionless load terminating one of said side arms, a first crystal positioned in the other of said side arms and a second crystal positioned in said E-plane arm, means for adjusting the impedance of said first crystal such that said crystal acts as an unmatched load whereby a portion of the power fed to said H-plane arm is coupled to said E-plane arm, a push-pull amplifier, means for coupling the outputs of said first and second crystals to said push-pull amplifier, and means for coupling the output of said amplifier to the reflector electrode of said oscillator to thereby control the power output thereof.

5. Apparatus for stabilizing the power output of a reflex velocity modulated oscillator comprising a magic-T wave guide assembly consisting of an E-plane arm, a pair of side arms in a parallel electrical relationship with said H-plane arm and an E-plane arm in a series electrical relationship with said side arms, a variable attenuator, means for coupling a portion of the output of said oscillator to the input of said variable attenuator, means for coupling the output of said variable attenuator to said H-plane arm, means for terminating one of the side arms of said magic-T with a matched load, a first crystal disposed within the other side arm, a shorting plunger terminating said last-mentioned side arm and adapted to tune said first crystal, a second crystal disposed within said E-plane arm, means for adjusting the magnitude of said variable attenuator and the relative position of said shorting plunger to equalize the outputs of said first and second crystals when said oscillator has the proper power output level, a push-pull amplifier, means for coupling the outputs of said first and second crystals to the input circuits of said amplifier and means for coupling the output of said amplifier to the reflector electrode of said reflex velocity modulated oscillator.

6. Apparatus for stabilizing the power output of a reflex velocity modulated oscillator comprising, in combination, a magic-T wave guide assembly consisting of an H-plane arm, a pair of side arms in a parallel electrical relationship with said H-plane arm and an E-plane arm in series electrical relationship with said side arms, means for coupling a portion of the output of said oscillator to said H-plane arm, a matched load terminating one of said side arms, a first crystal in the other of said side arms, a second crystal in said E-plane arm, means for tuning said crystals such that their outputs are oppositely affected by substantially equal amounts in response to changes in the level of power coupled to said H-arm, means for initially regulating the amount of power coupled to said H-plane arm whereby equal outputs are obtained from said crystals when said oscillator operates at a predetermined power output level, a push-pull amplifier, means for connecting the outputs of said first and second crystals to the input circuits of said amplifier and means for connecting the output of said amplifier to the reflector electrode of said oscillator to thereby control the latter's output power.

References Cited in the file of this patent

UNITED STATES PATENTS

| Number | Name | Date |
|---|---|---|
| 2,255,727 | Allison | Sept. 9, 1941 |
| 2,264,369 | Gollicke | Dec. 2, 1941 |
| 2,888,486 | Rivlin | June 30, 1942 |
| 2,343,539 | Edson | Mar. 7, 1944 |
| 2,406,850 | Pierce | Sept. 3, 1946 |
| 2,413,939 | Benware | Jan. 7, 1947 |
| 2,445,896 | Tyrrell | July 27, 1948 |
| 2,474,580 | Hiehle | June 28, 1949 |
| 2,475,074 | Bradley et al. | July 5, 1949 |
| 2,493,011 | Miller | Jan. 3, 1950 |
| 2,586,497 | Ginzton et al. | Feb. 19, 1952 |
| 2,589,861 | Pound | Mar. 18, 1952 |